United States Patent
Singh et al.

(10) Patent No.: US 7,184,393 B1
(45) Date of Patent: Feb. 27, 2007

(54) METHOD AND APPARATUS FOR MULTIUSER ACCESS IN A MULTICARRIER MODULATION NETWORK

(75) Inventors: Manoneet Singh, Sunnyvale, CA (US); Jerry Krinock, San Jose, CA (US); Thomas Michael Paff, Los Altos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1004 days.

(21) Appl. No.: 10/095,327

(22) Filed: Mar. 11, 2002

(51) Int. Cl.
*H04J 11/00* (2006.01)
(52) U.S. Cl. .................................................. 370/203
(58) Field of Classification Search ................ 370/208, 370/203, 330, 443
See application file for complete search history.

(56) References Cited

U.S. PATENT DOCUMENTS

| | | | |
|---|---|---|---|
| 6,192,026 B1 | 2/2001 | Pollack et al. | 370/203 |
| 6,279,158 B1 | 8/2001 | Geile et al. | 725/126 |
| 6,567,374 B1 * | 5/2003 | Bohnke et al. | 370/203 |
| 6,643,333 B1 * | 11/2003 | Jung et al. | 375/295 |
| 2002/0147017 A1 * | 10/2002 | Li et al. | 455/447 |
| 2002/0183067 A1 * | 12/2002 | Airy et al. | 455/455 |

OTHER PUBLICATIONS

"Data-Over-Cable Service Interface Specifications, Radio Frequency Interface Specification, SP-RFIv2.0-I01-011231", pp. 173-181, published Dec. 31, 2001 by Cable Television Laboratories, Inc.
Shinsuke Hara and Ramjee Pradsad, IEEE Communications Magazine, pp. 126-133, "Overview of Multicarrier CDMA" published Dec. 1997 by Institute of Electrical and Electronic Engineers, Inc.
Richard Van Nee and Ramjee Prasad, "OFDM For Wireless Multimedia Communications", ISBN 0-89006-530-6, Chapter 2 "OFDM Basics" pp. 33-35, published in 2000 by Artech House Publishers of Boston and London.
Ahmad R. S. Bahai and Burton R. Saltzberg, "Multi-Carrier Digital Communications Theory and Appications of OFDM", ISBN 0-306-46296-6, pp. 210-213, published in 1999 by Kluwer Academic/Plenum of New York, NY.
Dimitri Bertsekas and Robert Gallagher, "Data Networks Second Edition", ISBN-81-203-708-1, pp. 312-321, fifth printing published Nov. 1997 by Prentice-Hall.

* cited by examiner

*Primary Examiner*—Derrick W. Ferris
(74) *Attorney, Agent, or Firm*—Steven A. Shaw; W. James Brady; Frederick J. Telecky, Jr.

(57) ABSTRACT

A multiple access system for a network using multicarrier modulation. To contend for service a subscriber station selects an upcoming frame in whose contention window it will contend, selects a contention slot within the window, selects a contention channel corresponding to a subset of the carriers used by the network, and imposes a contention code differentially on the carriers in the contention channel.

14 Claims, 6 Drawing Sheets

METHOD AND APPARATUS FOR MULTIUSER ACCESS IN A MULTICARRIER MODULATION NETWORK

BACKGROUND OF THE INVENTION

1. Field of the Invention

The invention relates generally to systems for multiple access and more particularly to a multiple access system for a network using multicarrier modulation.

2. Description of the Prior Art

One of the key design functions in a data network is the mechanism by which multiple users share the resources of the network. The sharing of the network resources by the users is termed "multiple access". For a network handling primarily constant bit rate sources, such as voice, a base station (for wireless) or central office (for wireline) can simply allocate a fixed bandwidth periodically to each active subscriber station (SS), based upon a predetermined data rate. For a bursty network, however, such a predetermined allocation results in extremely inefficient usage of the total network bandwidth since all SSs are not active all the time. In a data network, therefore, a method of on-request allocation of resources is generally preferred.

Several kinds of on-request allocation methods have been proposed and studied in the prior art. The simplest method is polling where the central office or base station (BS) polls all SSs at regular intervals to check whether they require uplink (SS to BS) network access for bandwidth, maintenance, or other needs. Polling works well when there are relatively few SSs in the network. However, polling is inefficient when the number of SSs is large because the overhead from polling uses a large percentage of the total network bandwidth. An alternative approach is a purely random access method, for example ALOHA, slotted ALOHA, carrier sense multiple access collision avoidance (CSMA/CA) or carrier sense multiple access collision detection (CSMA/CD). However, such random access methods are not able to guarantee quality of service (QOS) requirements, such as bounded delay, under heavy loading. Moreover, the efficiency of the random access systems is limited due to collisions between SS transmissions.

An important hybrid class of multiple access methods developed recently is that of "contention-based" access. In these methods an SS requests uplink access by transmitting a contention packet in a reserved part of each uplink frame. If the contention packet is received successfully, the office or base responds by making a suitable allocation to the SS. These methods are able to handle bursty data traffic with low overhead and guarantee low delays required to support delay-sensitive traffic. Contention-based methods have therefore become quite popular in present data networks. For example, the data over cable service interface specification (DOCSIS) for a cable modem network uses a contention window based on slotted ALOHA, while the actual uplink allocations are contention-free and scheduled by the office or base.

Meanwhile, multicarrier modulation, in particular orthogonal frequency division multiplexing (OFDM), has been gaining prominence as a physical layer technology for high-speed data networks operating in harsh dispersive channels. While the slotted ALOHA based contention method described above offers reasonable performance with single carrier modulation, the efficiency of this scheme is dramatically reduced when used with multicarrier modulation. This is because, unlike DOCSIS, where contention slots are all of relatively short duration (minislots), an OFDM symbol is, by definition much longer than a single carrier symbol. Furthermore, decoding a contention packet requires the office or base to have an estimate of the channel to the SS, which would require an additional preamble to be transmitted before each contention packet, thereby further decreasing the efficiency of the request process. Both of these factors put together drastically reduce the efficiency of the ALOHA based schemes for OFDM systems.

On the other hand, multicarrier transmission affords some unique opportunities for designing an optimum multiple access mechanism. Specifically, in OFDM/OFDMA besides the time dimension, the frequency dimension is also available to design a request access scheme. This observation has been used in the prior art to design signal formats in which the OFDM modulation is combined with code division multiple access (CDMA) codes for data transmission. It might be envisioned that some of these proposed schemes could also be tailored for request access as well. For example, one could design a system in which more than one contending user is accommodated per OFDM/OFDMA symbol. Unfortunately, such a scheme would suffer from a severe loss of orthogonality over a frequency-selective channel and thus, would not be robust under the constraints imposed by dispersive channels. Alternatively, multiuser detection would be required for optimal performance leading to enormous complexity as well as training requirements. Thus, there continues to be a need for improved techniques of requesting service in a multiple access multicarrier modulation data network.

SUMMARY OF THE INVENTION

It is therefore an object of the present invention to provide an efficient method of requesting service in a multiple access multicarrier modulation network.

Briefly, in a preferred embodiment, the present invention operates by setting up a time and a frequency partition of a contention window within any orthogonal frequency division multiplexing (OFDM) uplink frame; and selecting a contention code. In the time partition, the OFDM symbols in the contention window are grouped into pairs. Each pair is termed a "contention slot". In the frequency partition, the carriers of the OFDM are segmented into sets called "contention channels". The carriers in the contention channel are modulated with the contention code.

To contend for service, a subscriber station (SS) must select four parameters.

1) An upcoming frame in whose contention window it will contend.

2) A contention slot within the contention window.

3) A contention channel.

4) A K-bit contention code to be imposed on the set of carriers and transmitted differentially across the pairs of carriers in the contention slot, where K is the number of carriers in the contention channel. The use of differential coding eliminates the need for prior training or channel estimation.

An advantage of the signal of the present invention is that a multiple access multicarrier modulation network using the signal has less overhead (is more efficient) for requesting service.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
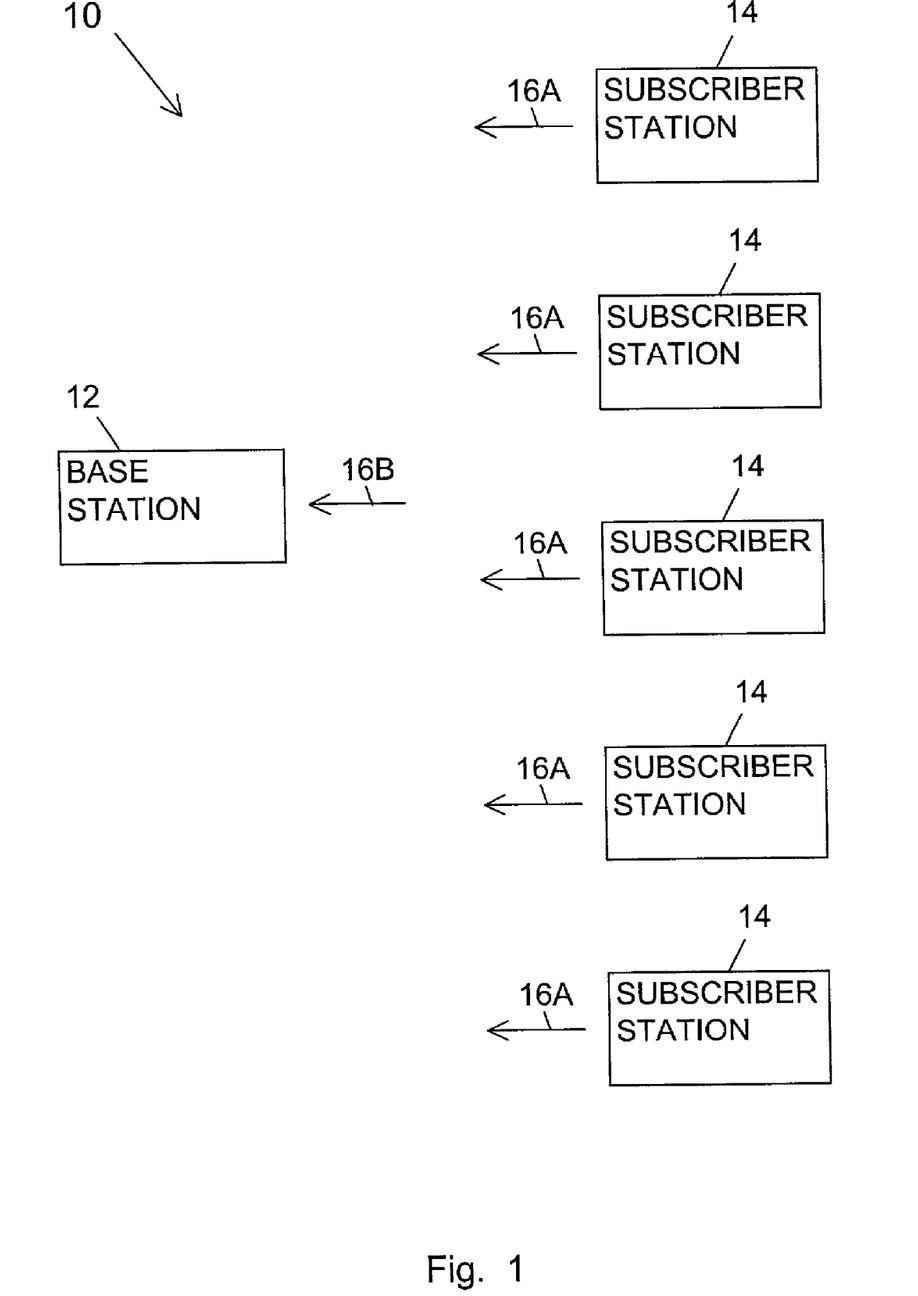
FIG. 1 is a block diagram of a multiple access multicarrier network of the present invention having an uplink service request signal.

FIG. 1 is a block diagram of a multiple access multicarrier network of the present invention referred to by a reference number 10. The network 10 includes a central office or base station 12 and multiple subscriber stations 14. The subscriber stations 14 request attention from the base station 12 by transmitting uplink service request signals 16A. The service request signals are then received by the base station 12 as a service request signal 16B. The service request signals 16A,B are orthogonal frequency division multiplexing (OFDM) multicarrier signals.

Figure 2:
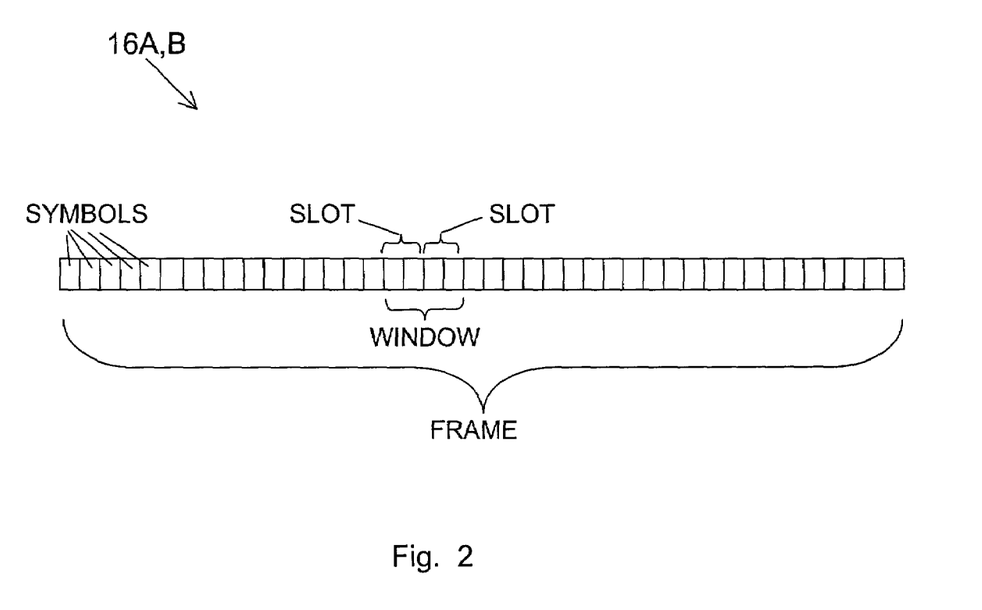
FIG. 2 is a diagram of a frame of the service request signal of FIG. 1.

FIG. 2 is a chart of a frame of the service request signals 16A,B. The frame is made up of successive symbols. A portion of the frame is designated as a contention window. The contention window includes contentions slots. Each contention slot includes a pair of symbols.

Figure 3:
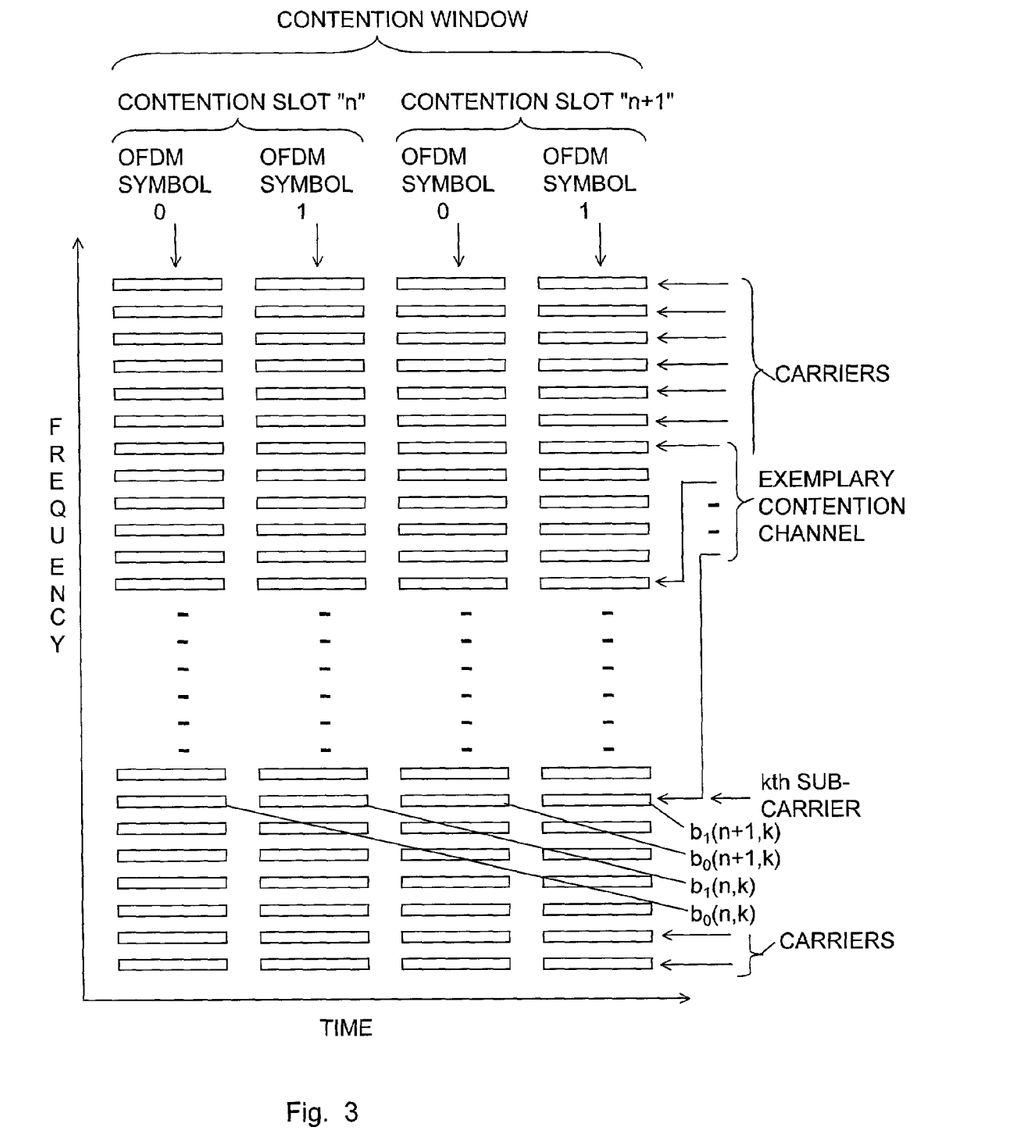
FIG. 3 is a time and frequency chart of the service request signal of FIG. 1.

FIG. 3 is a chart of time and frequency for the service request signals 16A,B. In time, the contention window is segmented into contention slots illustrated as contention slot n and contention slot n+1. Each contention slot includes a pair of orthogonal frequency division multiplexing (OFDM) symbols illustrated as first OFDM symbol 0 and second OFDM symbol 1.

In frequency, the OFDM symbols are composed of multiple carriers. The carriers are segmented into subsets termed contention channels. The subset of carriers making up a contention channel are sometimes termed subcarriers. In the following description, the total number of carriers in a contention channel is labeled "K", and the index "k" is used to refer to a particular subcarrier in the set.

A pair of subcarriers in a contention slot carries a "bit" of a K-bit contention code differentially across the contention slot. The contention code is keyed differentially. In one preferred embodiment, the modulation may be binary phase shift key (BPSK). For an $N_{FFT}$ point OFDM network, there are up to $N_{FFT}$ carriers available. The segmentation of the $N_{FFT}$ subcarriers into contention channels is determined and specified once during network design. The contention slot, contention channel and contention code may be randomly selected with an equal probability to each available choice.

For example, let $b_0(k,n)$ denote a first (randomly chosen) phase bit transmitted on the kth subcarrier in the nth contention slot in symbol 0 in signal 16A. Then the second phase bit $b_1(k,n)$ on the kth subcarrier in the nth contention slot in symbol 1 in signal 16A is shown in an equation 1.

$$b_1(k,n) = C_m(k) b_0(k,n) \tag{1}$$

The bit $b_0(k,n)$ may be chosen arbitrarily by the subscriber station 14. Then, $\{C_m(k)\}_k$ are the bits of the (K-bit) mth code, selected by the subscriber station 14 to transmit in that frame. A code book of 2K codes is used in focused contention. In one preferred embodiment, the first K codes are the rows of a K×K Hadamard-Walsh matrix; i.e. Walsh codes. The remaining K codes are their bitwise complements.

Figure 4:
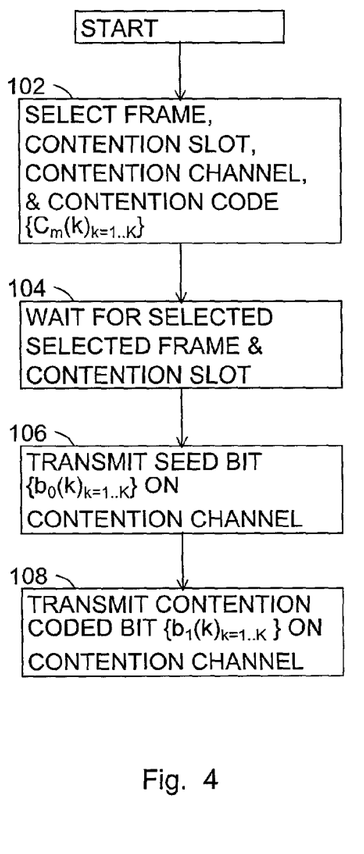
FIG. 4 is a flow chart of a method in a subscriber station for generating the service request signal of FIG. 1.

FIG. 4 is a flow chart of a method of generating a request for service in the multicarrier multiple access network 10. In a step 102 the subscriber station 14 selects the frame, contention slot, contention channel and contention code $C_m(k)_{k=1 \ldots K}$. In a step 104 the subscriber station 14 waits for the selected frame and contention slot. In a step 106 the subscriber station 14 transmits the seed bits $b_0(k)_{k=1 \ldots K}$ (symbol 0) on the contention channel. Then in a step 108 the subscriber station 14 transmits the contention coded bits $b_1(k)_{k=1 \ldots K}$ (symbol 1) on the contention channel.

The transmitted bits $b_0(k,n)$ and $b_1(k,n)$ in the signal 16A are then received by the central office or base station 12 across a frequency selective channel as bits $r_0(k,n)$ and $r_1(k,n)$, as shown in equations 2 and 3, in the signal 16B.

$$r_0(k,n) = b_0(k,n) H(k,n) + n'(k) \tag{2}$$

$$r_1(k,n) = b_1(k,n) H(k,n) + n(k) \tag{3}$$

In equations 2 and 3, Greek letter eta(k) and eta'(k) denote uncorrelated additive noise, and H(k,n) denotes the channel transfer function at the kth tone (carrier), assumed to be invariant across two OFDM symbols as described in equation 4 for an L path channel with delay tau(l,n).

$$H(k, n) = \sum_{l=1}^{L} h_{l,n} e^{-j2\pi f \tau_{l,n}} \bigg|_{f=k/T_s} \tag{4}$$

The equation 4 assumes that during the nth contention slot interval, the lth path has a complex gain as shown in an equation 5.

$$h_{l,n} = h_{l,n}^I + j h_{l,n}^Q \tag{5}$$

Once all relevant subscriber stations 14 have contended during the contention window, the base station 12 must search the composite received signal for the presence or absence of valid codes in all the contention channels in all the contention slots of the contention window. In one preferred embodiment, the base station 12 computes two metrics errCode(m) and errPower(m).

The first metric, for the errCode(m), is shown in an equation 6.

$$errCode(m) = \frac{1}{K} \sum_k |r_0(k,n) - C_m(k) r_1(k,n)| \tag{6}$$

In the equation 6, k is the subcarrier index for K denoting the total number of subcarriers in the contention channel; $r_0(k,n)$ and $r_1(k,n)$ denotes the first and second symbols 0 and 1, respectively, received by the base station 12 for the contention slot n and the subcarrier k; and $C_m(k)$ denotes the code bit for the code m and the subcarrier k.

The second metric, for the errPower(m), is shown in an equation 7

$$errPower(m) = \left| \frac{1}{K} \left| \sum_k |r_0(k,n)|^2 - 1 \right| \right| \qquad (7)$$

Note that in the equation 7 the term $|r_1(k,n)|^2$ could have been used in place of the term $|r_0(k,n)|^2$ or a combination of the two terms could be used because both terms are affected equally by the same power variations and channel dispersion. Finally the two error metrics may be combined in some manner to form a decision variable.

$$errComposition(m)=errCode(m)+errpower(m) \qquad (8)$$

An equation 8 shows the two metrics errcode(m) and errPower(m) simply added together for an errComposition (m). A combination using a weighted sum or product of the errCode(m) and errPower(m) may be used. For each three-tuple of contention window, contention slot and contention channel, the errcomposition(m) is compared to a decision threshold. If the errcomposition(m) exceeds the allowed threshold the result is ignored. If the errcomposition(m) does not exceed the allowed threshold, the result is interpreted as a valid detection. With a valid detection, higher layers of a protocol stack are initiated to identify and, subsequently, make a suitable allocation to the subscriber station 14 that is requesting service.

Figure 5:
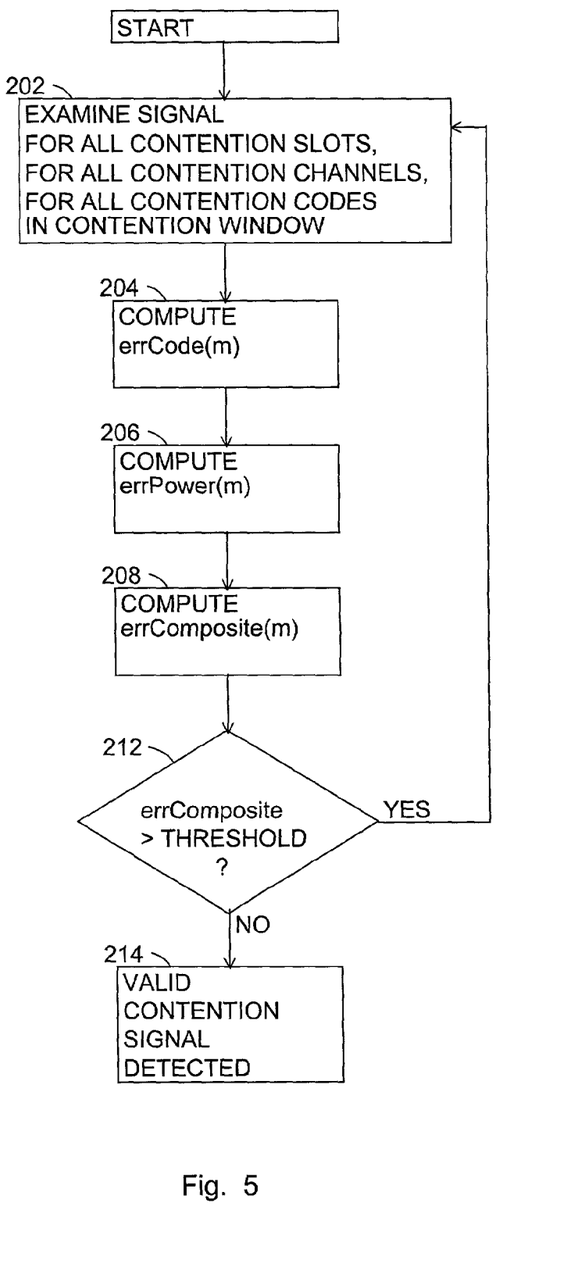
FIG. 5 is a flow chart of a method in a base station of servicing the service request signal of FIG. 1.

FIG. 5 is a flow chart of a method of detecting a request for service in the multicarrier multiple access network 10. In a step 202 the base station 12 examines the signal 16B for all contention slots, for all contention channels, for all contention codes in the contention window. In a step 204 the base station 14 computes the errCode(m). In a step 206, the base station 12 computes the errPower(m). In a step 208 the base station 12 computes the errComposition(m). In a step 212 the base station 12 compares the errcomposition(m) to a decision threshold. When the errcomposition(m) exceeds the threshold, the result is ignored and the base station 12 continues examining the signal 16B in the step 202 and computing the errcode(m) in the 204, the errPower(m) in the step 206, the errcomposition(m) in the step 208 and comparing to the threshold in the step 212. When the errComposition(m) does not exceed the threshold, then in a step 214 a service request signal 16B is determined to be a valid contention signal.

Figure 6:
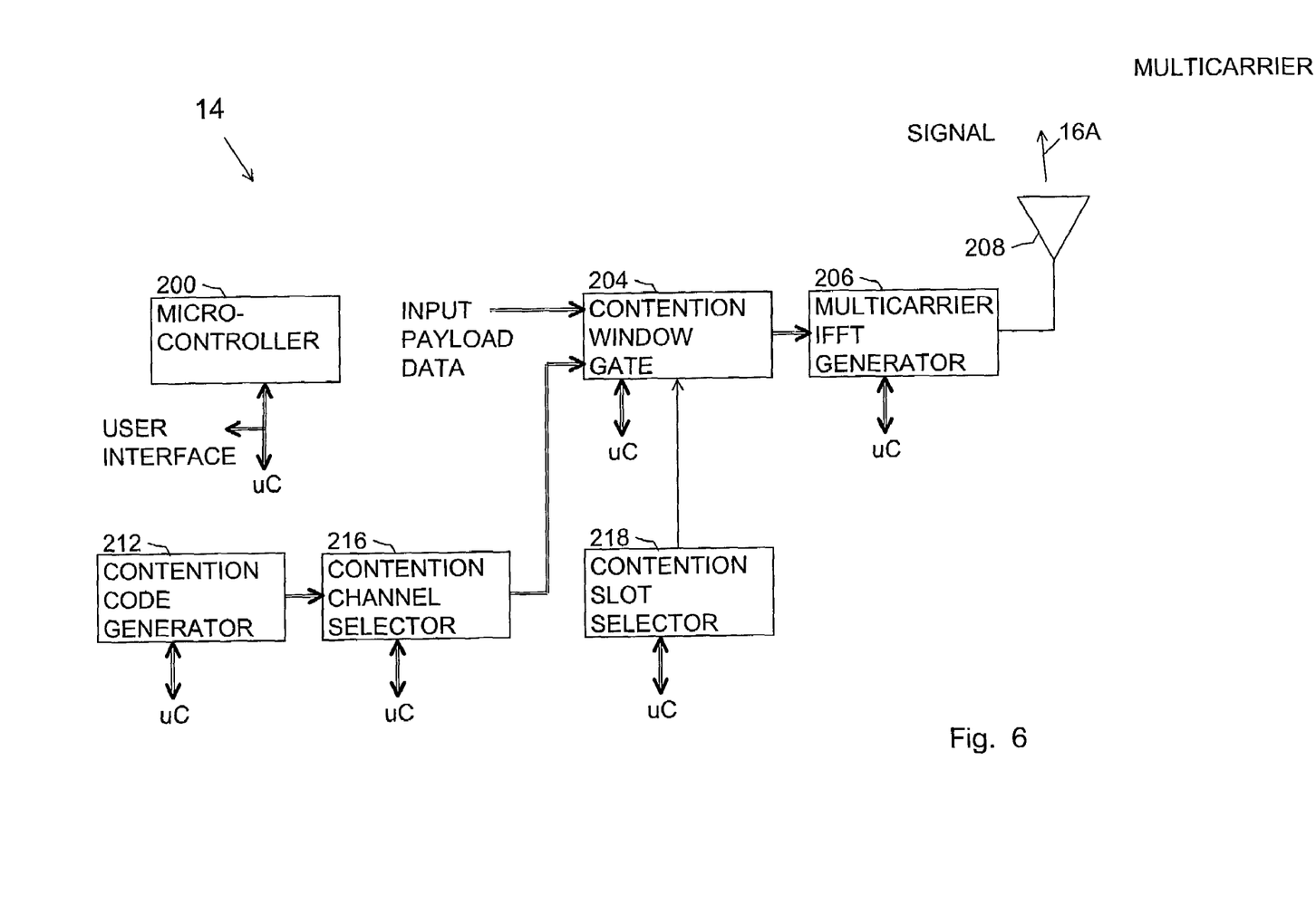
FIG. 6 is a block diagram of a subscriber station of the network of FIG. 1.

FIG. 6 is a block diagram of the subscriber station 14. The subscriber station 14 includes a microcontroller 200, a contention window gate 204, a multicarrier IFFT signal generator 206, and an antenna 208. The contention window gate 204 passes QAM input payload data to the multicarrier IFFT generator 206 during normal operation or passes contention data to the multicarrier IFFT generator 206 during the selected contention windows. The multicarrier IFFT generator 206 uses the data as tones (carriers), performs an inverse fast Fourier transform on the carriers, appends the cyclic prefix, frequency upconverts to radio frequency (RF), and issues an RF multicarrier signal to the antenna 208. The antenna 208 radiates the RF multicarrier signal as the signal 16A.

The subscriber station 14 also includes a contention code generator 212, a contention channel selector 216, and a contention slot selector 218. The contention code generator 212 determines the K-bit contention code that is to be used and provides differentially encoded contention data. The first symbol 0 has initial levels for the K-bits. The levels of the second symbol 1 are the initial levels multiplied by the K-bit code. For example, when the initial levels are all 1's, and the code is +1, −1, +1, +1, −1, . . . , then the symbol 1 levels are +1, −1, +1, +1, −1, . . . . The levels may be QAM levels and the coding may be complex. The K-bits for the symbols 0 and 1 are mapped onto phase or QAM levels. A preferred embodiment, uses binary phase shift key (BPSK).

The contention channel selector 216 impresses the contention data from the contention code generator 212 onto the selected subset of carriers of the contention channel to form the input contention data that is issued to the contention window gate 204. The contention slot selector 218 selects the contention slots within the contention window that are used. The contention slot selector 218 may be included in the contention window gate 204. The microcontroller 200 issues control data and receives status data over a uC bus to and from the elements of the subscriber station 14 and the user interface for selecting a frame in which the contention window is used, the contention slot in the contention window, the contention channel, and the contention code.

Figure 7:
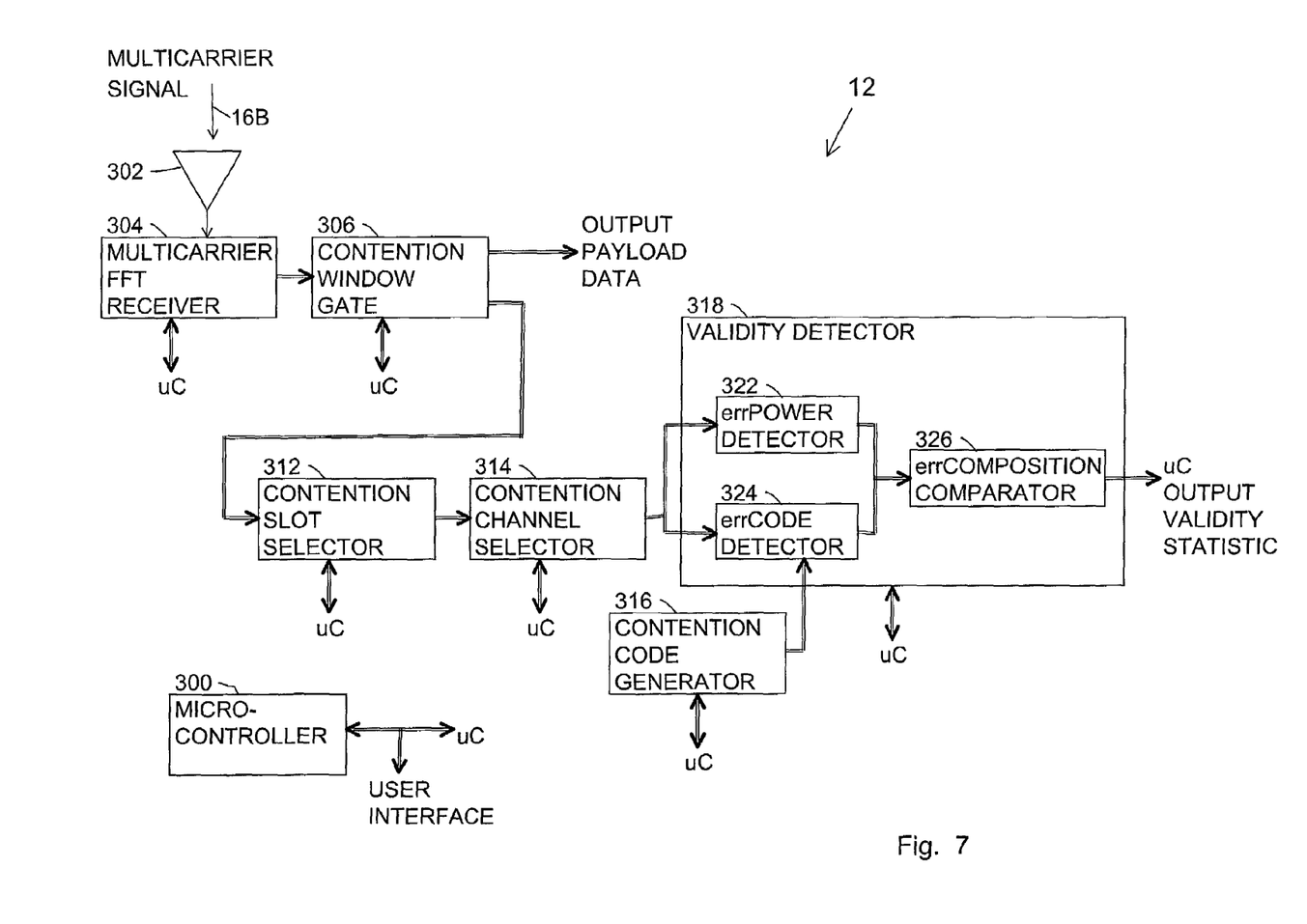
FIG. 7 is a block diagram of a base station of the network of FIG. 1.

FIG. 7 is a block diagram of the base station 12. The base station 12 includes a microcontroller 300, an antenna 302, a multicarrier signal FFT receiver 304 and a contention window gate 306. The antenna 302 receives the RF multicarrier signal 16B and passes the signal in a conducted form to the multicarrier FFT receiver 304. The multicarrier FFT receiver 304 frequency downconverts the RF multicarrier signal, performs a fast Fourier transform to provide QAM modulated tones (carriers), and issues the tones to the contention window gate 306.

The base station 12 also includes a contention slot selector 312, a contention channel selector 314, a contention code generator 316, and a validity detector 318. The contention window gate 306 issues the tones (carriers) as output payload data during normal operation or passes the tones as contention data to the contention slot selector 312 during contention windows. The contention slot selector 312, the contention channel selector 314 and the contention code generator 316 operate together to test all contention slots, all contention channels (subsets of carriers) and all contention codes during each contention window. The contention slot selector 312 can be a part of the contention window gate 306. The contention slot selector 312 and contention channels selector 314 act together to pass the k-bits for the first and second symbols 0 and 1 for each of the contention channels to the validity detector 318.

The validity detector 318 includes a errpower detector 322, an errcode detector 324, and an errcomposition detector 326. The errcode detector 324 uses the contention codes from the contention code generator 316 differentially on the first and second symbols 0 and 1 for computing the errCode (m). The errpower detector 322 computes the errPower(m) from the power level in the first or second symbols. The errcomposition comparator computes the errcomposition (m) from a combination of the errCode(m) and errPower(m) and then compares the errcomposition(m) to the decision threshold as described above for determining when a valid service request signal 16B has been received. The microcontroller 300 issues control data and receives status data over a uC bus to and from the elements of the base station 12 and the user interface for selecting the contention slots, contention channels, and contention codes.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for requesting service in a multiple access multicarrier network, comprising:
   selecting a contention slot comprised of first and second multicarrier symbol times, within a contention window comprised of a plurality of contention slots within a frame;
   selecting a subset of a plurality of carriers used to produce multicarrier symbols in said multicarrier network, as a contention channel; and
   transmitting a service request signal comprising a first symbol transmitted in the first multicarrier symbol time over the contention channel, and a second symbol corresponding to a coded version of the first symbol transmitted in the second multicarrier symbol time over the contention channel.

2. The method of claim 1, further comprising:
   selecting a contention code; and
   encoding the second symbol according to said selected contention code.

3. The method of claim 2, wherein:
   the step of encoding the second symbol includes encoding the second symbol differentially, relative to the first symbol, with said contention code.

4. A subscriber station in a multiple access multicarrier network, comprising:
   a contention channel selector for selecting a subset of a plurality of carriers used to produce multicarrier symbols in said multicarrier network, as a contention channel;
   a contention window gate for selecting a contention slot comprised of first and second multicarrier symbol times, within a contention window comprised of a plurality of contention slots within a frame; and
   a multicarrier signal generator for transmitting a service request signal comprising a first symbol transmitted over the contention channel in the first multicarrier symbol time, and a second symbol corresponding to a coded version of the first symbol, and transmitted over the contention channel in the second multicarrier symbol time.

5. The subscriber station of claim 4, further comprising:
   a contention code generator for encoding the second symbol according to a selected contention code.

6. The subscriber station of claim 5, wherein:
   the contention code generator is further for encoding the second symbol differentially, relative to the value of the first symbol, with said contention code.

7. A method for detecting a service request signal in a multiple access multicarrier network, comprising:
   designating a contention window, comprised of a plurality of contention slots, each contention slot comprising first and second symbol times, within a frame;
   designating contention channels as subsets of a plurality of carriers used to produce multicarrier symbols in said multicarrier network;
   receiving signals over the contention channels in the contention window; and
   for at least one contention channel in at least one contention slot, computing metrics from the first and second symbol times to determine whether a valid service request signal was received.

8. The method of claim 7, wherein the step of computing said metrics comprises:
   deriving an error value based on symbol values received in the first and second symbol times and a contention code.

9. The method of claim 8, wherein the step of computing said metrics further comprises:
   deriving a power value for the signal received in the at least one contention channel in the at least one contention slot; and
   determining validity based upon a combination of the error value and the power value.

10. The method of claim 7, wherein the contention code is a differential code.

11. A base station in a multiple access multicarrier system, comprising:
    a multicarrier receiver for transforming a received multicarrier signal into a plurality of complex values associated with a plurality of carriers;
    a contention window gate for selecting values from the multicarrier receiver within at least one contention slot comprised of first and second multicarrier symbol times, within a contention window comprised of a plurality of contention slots within a frame;
    a contention channel selector for selecting subsets of the plurality of carriers as contention channels; and
    a validity detector for computing metrics from the first and second symbol times for at least one selected contention channel in at least one contention slot in said contention window to detect valid service request signals.

12. The base station of claim 11, further comprising:
    a contention code generator for providing contention codes;
    and wherein the validity detector comprises a first detector for computing an error value based on received symbol values in the first and second symbol times of a selected contention channel within a selected contention slot, and a contention from the contention code generator.

13. The base station of claim 12, wherein the validity detector further comprises:
    a second detector for computing a power value for at least one symbol value received in the selected contention channel in the selected contention slot; and
    a comparator for using the error value and the power value to determine whether a decision threshold is met.

14. The base station of claim 11, wherein the contention code is a differential code.

* * * * *